(12) United States Patent
Geissdörfer et al.

(10) Patent No.: US 7,299,108 B2
(45) Date of Patent: Nov. 20, 2007

(54) METHOD FOR GUIDING THE MOVEMENT OF A MOVABLE MACHINE ELEMENT OF A NUMERICALLY CONTROLLED MACHINE TOOL OF PRODUCTION MACHINE BY DETERMINING INERTIA MATRICES FOR SUPPORT POINTS USING ACCELERATION AND TORQUE COEFFICIENTS

(75) Inventors: Klaus Geissdörfer, Erlangen (DE); Carsten Hamm, Erlangen (DE); Wolfgang Papiernik, Neunkirchen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/556,209

(22) PCT Filed: Apr. 23, 2004

(86) PCT No.: PCT/EP2004/004349

§ 371 (c)(1),
(2), (4) Date: Nov. 9, 2005

(87) PCT Pub. No.: WO2004/102292

PCT Pub. Date: Nov. 25, 2004

(65) Prior Publication Data

US 2006/0287758 A1 Dec. 21, 2006

(51) Int. Cl.
*G06F 19/00* (2006.01)
(52) U.S. Cl. .................................. 700/188; 700/186
(58) Field of Classification Search .............. 700/186, 700/188
See application file for complete search history.

(56) References Cited

U.S. PATENT DOCUMENTS 7,146,242 B2 * 12/2006 Weinhofer .................. 700/189

(Continued)

FOREIGN PATENT DOCUMENTS

DE 198 41 716 A1 3/2000

(Continued)

OTHER PUBLICATIONS

Höpler, Robert & Otter, Martin: "A Versatile C++ Toolbox for Model Based, Real Time Control Systems of Robotic Manipulators"; Proceedings of the 2001 IEEE/RSJ, Hawaii, USA, Oct. 29, until Nov. 3, 2001, pp. 2208-2214.

(Continued)

*Primary Examiner*—Ryan A Jarrett
(74) *Attorney, Agent, or Firm*—Henry M. Feiereisen; Ursula B. Day

(57) ABSTRACT

The invention relates to a method for guiding the movement of a movable machine element (8) of a numerically controlled tool machine or production machine on a predetermined movement path (s) of the machine element (8). Supporting points (32) are defined in the working area (31) of the machine. The maximum possible path jerk ($\dddot{s}$) and/or the maximum possible path acceleration ($\ddot{s}$) and/or the maximum possible path speed ($\dot{s}$) of the machine element (8) is determined or predetermined at on each supporting point (32) and the movement of the machine element (8) on the displacement path (S) is carried out using the maximum possible path jerk ($\dddot{s}$) and/or the maximum possible path acceleration ($\ddot{s}$) and/or the maximum possible path speed ($\dot{s}$) of the machine element (8). Said method can be produced in a simple and economical manner with optimum guiding of the movement of a movable machine element (8) of a numerically controlled tool machine or production machine on a predetermined movement path (S) of a machine element (8).

24 Claims, 4 Drawing Sheets

U.S. PATENT DOCUMENTS 7,180,253 B2 * 2/2007 Weinhofer et al. ............ 318/34

FOREIGN PATENT DOCUMENTS

| DE | 199 52 388 A1 | 6/2001 |
| EP | 0 262 600 A | 4/1988 |
| EP | 0 459 251 A1 | 12/1991 |
| EP | 0 685 779 A1 | 12/1995 |
| WO | WO 96/12992 | 5/1996 |
| WO | WO 97/29890 A | 8/1997 |
| WO | WO 99/29474 | 6/1999 |
| WO | WO 03/007129 | 1/2003 |

OTHER PUBLICATIONS

"Institutsbericht 2003"—Institut für Automatisierungstechnik, TU Darmstadt, Jan. 1, 2001 until Oct. 31, 2002.

"Mit virtueller Hilfe wird die Maschine schneller marktreif"—Effiziente Entwicklung von Werkzeugmaschinen,i In: Industrieanzeiger—AWK 2002, pp. 26-28.

* cited by examiner

PRIOR ART

METHOD FOR GUIDING THE MOVEMENT OF A MOVABLE MACHINE ELEMENT OF A NUMERICALLY CONTROLLED MACHINE TOOL OF PRODUCTION MACHINE BY DETERMINING INERTIA MATRICES FOR SUPPORT POINTS USING ACCELERATION AND TORQUE COEFFICIENTS

The invention relates to a method for guiding the movement of a movable machine element of a numerically controlled machine tool or production machine on a prescribed movement path of the machine element.

A customarily used electric drive system of a machine tool or production machine is illustrated in the form of a block diagram in FIG. 1. In the case of the two-axis machine illustrated by the example in FIG. 1, a controller 1 controls the two drive axes 6a and 6b of the machine. The drive axis 6a is composed in this case of a closed-loop control 2a, an inverter 3a, a drive motor 4a and a mechanism 5a connected to the drive motor 4a. The drive axis 6b is composed of a closed-loop control 2b, an inverter 3b, a drive motor 4b and a mechanism 5b connected to the drive motor 4b. The controller 1 prescribes setpoint positions separately for each drive axis in accordance with a prescribed movement path of a machine element that can be moved by means of the drive axes 6a and 6b. The closed-loop control 2a or 2b controls the respectively associated motor position angle of the motor 4a or 4b via the inverter 3a or 3b in accordance with the nominal defaults from the controller such that the prescribed movement path of the machine element is executed with the aid of the mechanism 5a or 5b connected to the respective drive motor 4a or 4b. During the machining process, a machine element is understood in this case both as a tool such as a milling head, for example, and as a workpiece.

FIG. 2 illustrates such a movement path S for the two-axis machine in accordance with FIG. 1, by way of example. Here, a machine element 8 designed as a milling head is guided on the movement path S. The drive axis 6a from FIG. 1 is responsible in this case for the traveling movement in the x-direction, while the drive axis 6b is responsible for the traveling movement in the y-direction. The movement path S is composed here of juxtaposed working points, of which one working point 7 is illustrated for the sake of clarity.

For this purpose, the numerical controller 1 in accordance with FIG. 1 processes subprograms that have been compiled, for example with the aid of a CAD/CAM system. The geometric data, for example for machining a workpiece, are stored in the controller 1. The task of the controller 1 consists in generating nominal variables for the drive axes of the machine, such that the machine element 8 is guided on the desired movement path S. Additional technical information, in particular knowledge of the properties of the machine, is required for this purpose. These properties such as, for example the maximum rotational speed of the drives, the maximum possible acceleration of the drives, or the maximum driving torques of the drive motors are stored in machine data and known to the controller 1. The movement guidance must now be planned by the controller 1 such that none of the prescribed restrictions (for example maximum possible acceleration of a drive motor) are violated. The thereby resulting movement profiles of the drive motors of the individual drive axes of the machine must be capable of realization. The planning of the movement guidance makes use for this purpose of the time derivatives of the path length s which are commercially available.

The principle of the planning of such movement guidance of a machine element is illustrated schematically in FIG. 3.

In accordance with the prescribed movement path S having the path length s traversed by the machine element 8, the movement guidance calculates the path jerk $\dddot{s}$, which represents the third time derivative of the path length S and which is fed as input variable to the so-called three memory model illustrated in FIG. 3. The path jerk $\dddot{s}$ is the highest time derivative in the integration chain, which is formed by the integrators 9a, 9b and 9c. A path acceleration $\ddot{s}$ is calculated from the path jerk $\dddot{s}$, a path speed $\dot{s}$ is calculated from the path acceleration $\ddot{s}$ by further integration, and the path length s is calculated from the path speed $\dot{s}$ by further integration.

In accordance with the specific kinematic transformation valid for the respective machine kinematics and known to the person skilled in the art, the path length s, path speed $\dot{s}$, the path acceleration $\ddot{s}$ and path jerk $\dddot{s}$ can be used to calculate for each motor of the machine participating in the movement the associated nominal motor position angle $\phi_{MS}$, the associated nominal motor angle of velocity $\dot{\phi}_{MS}$, the associated nominal motor angular acceleration $\ddot{\phi}_{MS}$, as well as the associated nominal motor angular jerk $\dddot{\phi}_{MS}$. The respective nominal motor position angle $\phi_{MS}$ forms the respective setpoint for the respectively associated position control loop (see FIG. 5) of the responsible closed-loop control 2a or 2b in accordance with FIG. 1 (an associated nominal motor position angle $\phi_{MS}$ is transferred per drive axis, that is to say the circuit illustrated in FIG. 3 exists separately for each drive axis of the machine). This helps to ensure that the current position of the machine element (for example of a milling head or another tool or else a workpiece) follows the prescribed setpoint.

By means of targeted stipulation of the input variable of path jerk $\dddot{s}$, or the other variables (path acceleration $\ddot{s}$, path speed s and path length s) can be transformed by integration from one state into another via suitable intermediate values such that all restrictions can be checked and observed. The restrictions establish the shortest duration of the machining operation. This signifies in the inverse conclusion that the movement guidance is time optimum whenever at least one variable reaches its possible maximum at each instant. The restrictions that have to be taken into account in the case of movement guidance have a correspondence to the real machine. Some assignments are possible without any problem and so, for example together with gear ratios and screw pitches of, for example, feed screws, the maximum rotational speed of the drives yields a maximum displacement speed.

However, the acceleration capability of the drive axes of the machine is limited by the maximum possible driving torques of the drive motors. However, the calculation of the driving torques to be applied for the purpose of traveling movement presupposes an exact knowledge of the machine kinematics. In the simplest case, this means taking account of a concentrated mass or of a concentrated moment of inertia in order to convert the acceleration known from the planned movement guidance into the associated driving torque. This simple conversion is not always possible. Many machine kinematics exist of which the drive axes have mechanical couplings. It is necessary in this case to apply the so-called Lagrange equations, which exhibit the relationship between the driving torques, the drive angles, the corresponding time derivatives of the drive angles and the corresponding inertia terms.

$$\text{Lagrange energy function } L = E_{kin} - E_{pot}$$

$$\text{Lagrange formalism } Q_i = \frac{d}{dt}\left(\frac{\partial L}{\partial \dot{q}_i}\right) - \frac{\partial L}{\partial q_i} \quad\quad (5)$$

$q_i$: generalized position coordinates of the kinematics
$Q_i$: generalized forces of the kinematics
$E_{kin}$: kinetic energy of all the masses
$E_{pot}$: potential energy of all the masses In the case of a machine, the position coordinates $q_i$ correspond to the motor position angles $\phi_{Mi}$ and the generalized forces $Q_1$ correspond to the driving torques $d_{Mi}$ of the ith drives (i=1 ... n).

The application of the Lagrange formalism leads to:

$$\varphi_{Mi} = \varphi_{Mi}(s) \quad\quad (20)$$

$$\dot{\varphi}_{Mi} = \underbrace{\frac{d\varphi_{Mi}}{ds}}_{\varphi'_{Mi}} \cdot \dot{s}$$

$$\ddot{\varphi}_{Mi} = \underbrace{\frac{d^2\varphi_{Mi}}{ds^2}}_{\varphi''_{Mi}} \cdot \dot{s}^2 + \frac{d\varphi_{Mi}}{ds} \cdot \ddot{s}$$

$\theta_{ii}$=main moments of inertia
$\theta_{ij}$=coupling moments of inertia
$c_{ij}$=Coriolis coefficients
$z_{ij}$=centrifugal coefficients If the motor position angles $\phi_{Mi}$ are given in the form of the arc length s in accordance with the relationships $$\varphi_{Mi} = \varphi_{Mi}(s)$$

$$\dot{\varphi}_{Mi} = \underbrace{\frac{d\varphi_{Mi}}{ds}}_{\varphi'_{Mi}} \cdot \dot{s}$$

$$\ddot{\varphi}_{Mi} = \underbrace{\frac{d^2\varphi_{Mi}}{ds^2}}_{\varphi''_{Mi}} \cdot \dot{s}^2 + \frac{d\varphi_{Mi}}{ds} \cdot \ddot{s}$$

the equation (20) has the form $$d_{Mi} = \underbrace{\left(\theta_{ii} \cdot \varphi'_{Mi} + \sum_{j=1}^{n} \theta_{ij} \cdot \varphi'_{Mj}\right)}_{:=c_{2,i}(s)} \cdot \ddot{s} + \quad\quad (18)$$

$$\underbrace{\left(\theta_{ii} \cdot \varphi'_{Mi} + \sum_{j=1}^{n} [\theta_{ij} \cdot \varphi''_{Mj} + c_{ij} \cdot \varphi'_{Mi} \cdot \varphi'_{Mj} + z_{ij} \cdot \varphi'^2_{Mj}]\right)}_{:=c_{1,i}(s)} \cdot \dot{s}^2$$

The time derivative of the driving torques is calculated as:

$$\dot{d}_{Mi} = \underbrace{\left(\theta_{ii} \cdot \varphi'_{Mi} + \sum_{j=1}^{n} \theta_{ij} \cdot \varphi'_{Mj}\right)}_{:=c_{2,1}(s)} \cdot \dddot{s} + 3 \cdot \underbrace{\left(\theta_{ii} \cdot \varphi'_{Mi} + \sum_{j=1}^{n} [\theta_{ij} \cdot \varphi''_{Mj}]\right)}_{:=c_{1,i}(s)} \cdot \dot{s} \cdot \ddot{s} + \quad\quad (19)$$

-continued $$\underbrace{\left(\theta_{ii} \cdot \varphi'_{Mi} + \sum_{j=1}^{n} \theta_{ij} \cdot \varphi''_{Mj}\right)}_{:=c_{3,i}(s)} \cdot \dot{s}^3$$

so that no drive is overloaded, it must hold that:

$-\breve{d}_{Mi,max} \leq d_{Mi} \leq \breve{d}_{Mi,max} \,\forall i$ and $-\breve{\dot{d}}_{Mi,max} \leq \dot{d}_{Mi} \leq \breve{\dot{d}}_{Mi,max} \,\forall i$ $-\breve{d}_{Mi,max}$ maximum possible driving torque in negative direction (specified by the manufacturer)

$\breve{d}_{Mi,max}$: maximum possible driving torque in positive direction (specified by the manufacturer)

i: ith drive axis of the machine (i=1 ... n)

The observance of these conditions leads to:

$$\phi_{Mi} = \phi_{Mi}(s) \quad\quad (14)$$

$$-\dot{\phi}_{Mi,max} \leq e'_i \cdot \dot{s} \leq \dot{\phi}_{Mi,max} \,\forall i \quad\quad (15)$$

$$-\breve{d}_{Mi,max} \leq c_i(s) \cdot \dot{s}^2 + c_2(s) \cdot \ddot{s} \leq \breve{d}_{Mi,max} \,\forall i \quad\quad (16)$$

$$-\breve{\dot{d}}_{Mi,max} \leq c_{3,i}(s) \cdot \dot{s}^3 + 3 \cdot c_{1,i}(s) \cdot \dot{s} \cdot \ddot{s} + c_{2,1}(s) \cdot \dddot{s} \leq \breve{\dot{d}}_{Mi,max} \,\forall i \quad\quad (17)$$

$-\dot{\phi}_{mi,max}$: maximum possible angular velocity in the negative direction (specified by the manufacturer)

$\dot{\phi}_{Mi,max}$: maximum possible angular velocity in the positive direction (specified by the manufacturer)

$\breve{d}_{Mi,max}$: maximum possible temporal change in the driving torque in the positive direction (specified by the manufacturer)

$\breve{\dot{d}}_{Mi,max}$: maximum possible temporal change in the driving torque in the negative direction (specified by the manufacturer)

i: ith axis of the machine(i=1 ... n)

The driving torque exerted by the drive motor of a drive axis implicitly effects the acceleration of a number of other drive axes. A movement of an axis then causes disturbing influences on the movement of the other drive axes. This can be taken into account adequately when planning the movement guidance only when the mass property and inertia properties of the machine are known. Furthermore, use is frequently made of machines whose mass properties and inertia properties are not constant in the working space of the machine. The reason for this can lie, inter alia, in kinematics that is nonlinear in principle, or masses which change because of different tools that are being exchanged during operation.

If the mass properties or inertia properties are not known, the data can be determined and/or estimated manually (experimentally, "trial and error"). If a safety coefficient that is necessarily to be generously dimensioned, the result is thus restrictions that are too restrictive and do not utilize the dynamics of the drive system optimally. The actually maximum possible acceleration values therefore cannot be attained.

If information is available in relation to the mechanical design (for example in the form of construction drawings), it is then possible to describe the machine mathematically using the means of analytical mechanics. For this purpose, kinematics and kinetics of the machine are formulated in the form of movement differential equations that can be used to determine the mass properties and inertia properties. This theoretical modeling is mostly very complicated, since the mathematic expressions become very voluminous, even for simple mechanical designs. In addition, machine kinematics are known for which there exists no analytical description.

At present, only a single machine datum for the entire movement guidance is provided kinetically per drive axis of the machine for deceleration on the movement path S. If the mass properties and inertia properties of a machine change in the working area, to date the maximum possible path of generation[??] on the movement path S has been determined by means of a worst case estimate that then holds for the entire working area of the machine and for the entire movement path S. Consequently, the possible dynamics are thereby not utilized optimally and the resulting curving period is longer than strictly necessary.

In order to limit the time derivatives of the nominal motor position angles, equations (14)-(17) are solved for the path length s, the path speed $\dot{s}$, the path acceleration $\ddot{s}$, and the path jerk $\dddot{s}$, or these variables are determined and taken into account during the movement guidance with regard to the restriction of the respective variable by the controller of the machine. As already described above, for this purpose a constant maximum path acceleration $\ddot{s}$ has been prescribed for the entire movement operation of the machine element 8 on the movement path S in the case of commercial controllers currently being used. By contrast therewith, in the present invention use is always made in equations (14) to (17) of the coefficients $c_i$ valid at the respective working points, and in such a way the movement of the machine element 8 proceeds at each working point for the maximum possible path acceleration $\ddot{s}$ and/or the maximum possible path jerk $\dddot{s}$ and/or the maximum possible path speed $\dot{s}$. Of course, there are yet other possibilities taking account of restrictions in a movement guidance in addition to the above named Lagrange equations such as, for example Newton-Euler equations or Hamilton equations, etc. but these all use the above mentioned coefficients $c_i$ in identical or modified form.

It may be remarked at this juncture that it is, of course, possible to apply the use not with restriction to Cartesian coordinates, but to any desired contexts of as many axes as desired whose movements are coupled via one or more common parameter, such as is often the case with printing machines, weaving looms, gear hobbing machines or the like. Of course, all the regularities apply not only to rotary drives but also to linear drives where, inert masses act instead of the moments of inertia.

It is the object of the invention to provide a method for optimum movement guidance of a movable machine element of a numerically controlled machine tool or production machine.

The object is achieved for the method according to the invention by virtue of the fact that support points are defined in the working area of the machine, the maximum possible path jerk and/or the maximum possible path acceleration and/or the maximum possible path speed of the machine element being determined or prescribed at each support point, and the movement of the machine element on the movement path being carried out with the maximum possible path jerk and/or the maximum possible path acceleration and/or the maximum possible path speed of the machine element.

The method according to the invention has substantial advantages by comparison with the prior art. Thus, the method according to the invention can be used to determine the full limiting values of the maximum permissible accelerations of the drive axes, and to render the control of the machine accessible. The movement guidance can always plan and carry out the movement optimally in terms of time, in particular with the actual possible acceleration capability of the drive axes and the drive motors. Furthermore, the acceleration capability can be determined very accurately. The limiting values are physically expedient in any case, and so it is possible to dispense with safety coefficients. The traveling movement of the machine element can therefore be carried out optimally in terms of time.

The method according to the invention can be used to determine the acceleration capability of the drive axes for the entire working area of the machine which can, for example be subdivided by a three-dimensional grating. The controller can plan the movement operation with the restrictions valid for the respective working point. Much shorter machining times result thereby, particularly in the case of conditions of mass properties and inertia properties of the machine that vary in the working area.

It proves to be advantageous for the invention that the support points in the working area of the machine are defined by a grid-like subdivision, or are prescribed by a user individually, particularly for a specific movement path S, since it is thereby possible to define the support points in the working area in a particularly efficient fashion.

It proves to be advantageous for the invention that for working points that are not support points, the maximum possible path jerk and/or the maximum possible path acceleration and/or the maximum possible path speed of the machine element at the support points are used to carry out a smoothing of these maximum possible variables, and the movement of the machine element for working points that are not support points is carried out with the maximum possible path jerk and/or the maximum possible path acceleration and/or the maximum possible path speed of the machine element. This ensures that only a relatively small number of support points need to be defined on the movement path, and that nevertheless an optimum movement guiding of the machine element is ensured.

Furthermore, it proves to be advantageous for the invention that the determination of the maximum possible path jerk and/or the maximum possible path acceleration and/or the maximum possible path speed of the machine element is carried out for each drive axis of the machine with the aid of the maximum possible driving torque of the drive motor and of an inertia matrix. A determination of the maximum possible path jerk and/or the maximum possible path acceleration and/or the maximum possible path speed of the machine element is particularly simple with the aid of an inertia matrix.

It proves to be advantageous in this context that the inertia matrix is determined for each support point in such a way that in a first step a support point of the machine element is approached, and that in a second step a respective excitation function is used to excite the position control circuits of the drive axis, the current motor position angle and the current driving torque or the current torque value being simultaneously stored over a specific period for each drive axis, these stored variables being used per drive axis to identify the coefficients of the driving torque and of the motor position angle, the second step being subsequently repeated in accordance with the number, reduced by the factor 1, of the drive axes with a respectively varied excitation function, and the acceleration and torque coefficients thus being determined, the inertia matrix for the respective position point being determined in a third step from the acceleration and torque coefficients. Here, the inventors have provided a particularly simple, efficient and reliable method for determining the inertia matrix.

Furthermore, it proves to be advantageous for the invention that in the case of a machine with constant inertial conditions, the determination of the maximum possible path jerk and/or the maximum possible path acceleration and/or the maximum possible path speed of the machine element, is carried out with the aid of a single support point. The period required for carrying out the method can be sharply reduced thereby.

It proves to be advantageous for a further embodiment of the invention that the maximum possible path jerk and/or the maximum possible path acceleration and/or the maximum possible path speed of the machine element of the machine are determined at the support points and/or working points with the aid of a simulation system, and the movement of the machine element on the movement path carried out with the maximum possible path jerk and/or the maximum possible path acceleration and/or the maximum possible path speed of the machine element. If there is a possibility of determining the above named variables in advance with the aid of a simulation system, these variables can also be prescribed directly to the controller of the machine without them having to be determined firstly by means of a traveling movement.

An exemplary embodiment of the invention is illustrated in the drawing and will be explained in more detail below. In this case:

FIG. 4 depicts the method according to the invention in the form of a block diagram. A definition of the support points is initially performed in a function block 28.

Figure 6:
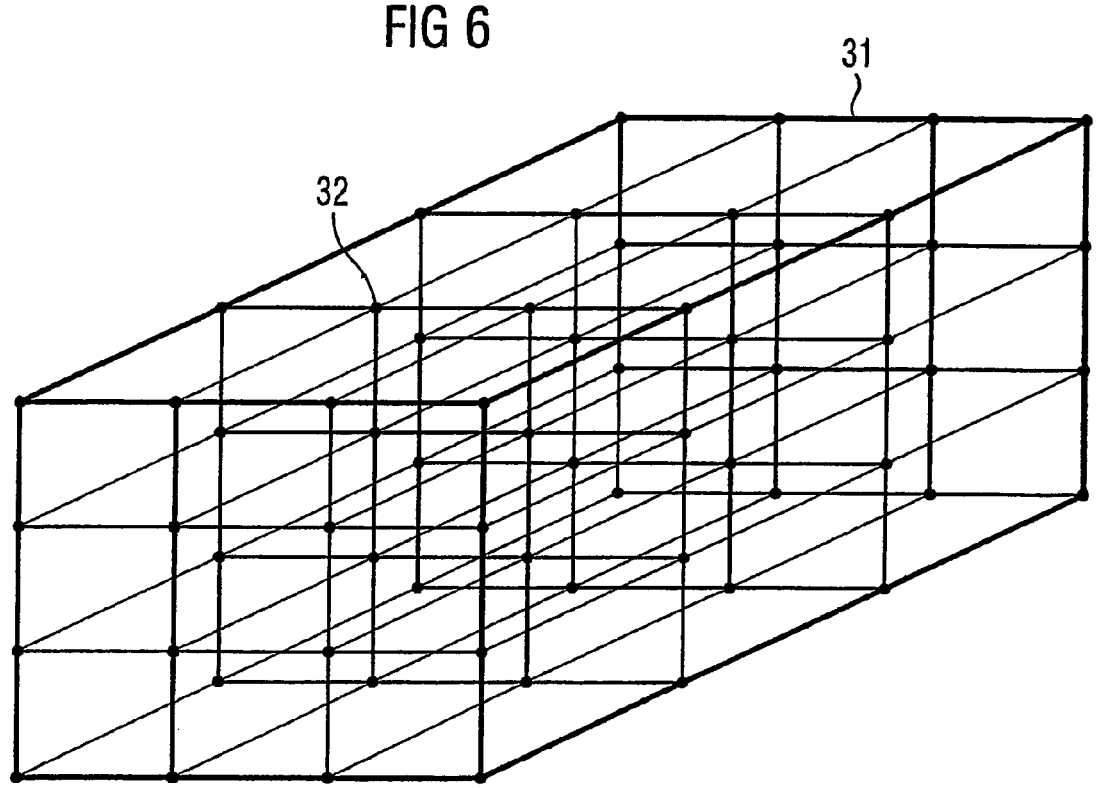
FIG. 6 shows a working area of the machine with grid-like subdivisions.

To this end, FIG. 6 shows in general terms that the working area 31 of the machine in which movement operation of the machine element takes place is subdivided by means of a three-dimensional grid, a linear subdivision being illustrated in FIG. 6. Of course, any other desired forms of grid and subdivisions are also possible. Particularly at critical points for the movement guidance, it can be expedient to adapt the identity of the support points about the movement path S. The points of intersection of the grid line yield the support points, of which only one support point 32 is enumerated in FIG. 6, for the sake of clarity. A three-dimensional grid which has degenerated to a planar grid is used here for the two-axis machine (only a two-dimensional movement path S is possible) used in the exemplary embodiment.

A first support point is subsequently approached in function block 21 by the machine element 8. The mass properties and inertia properties of the machine are now to be determined below in the form of a so-called inertia matrix $\underline{M}$. At the respective support point, this supplies the valid linear relationship between the acceleration of the machine element or the drive motors and the respective driving torques required for the purpose and which are to be applied by the drive motors. The machine is operated for this purpose with a closed position control loop.

Figure 1:
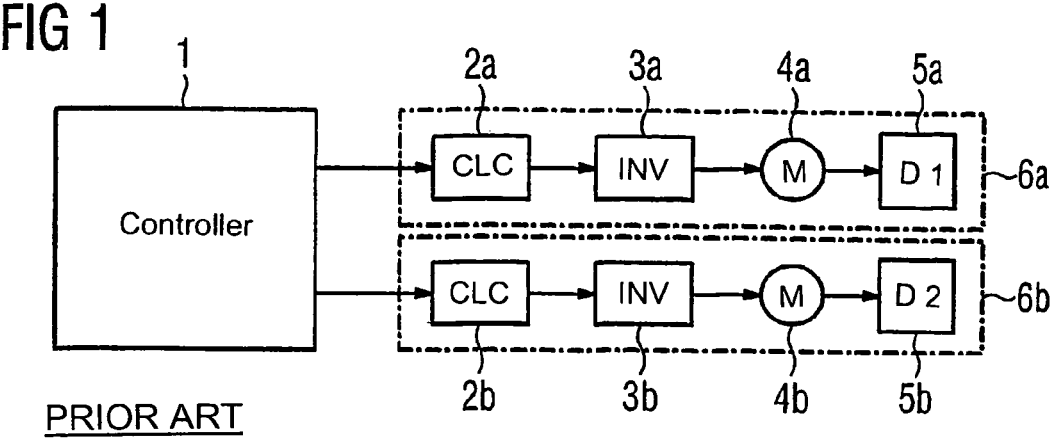
FIG. 1 shows a drive system of a two-axis machine.
Figure 4:
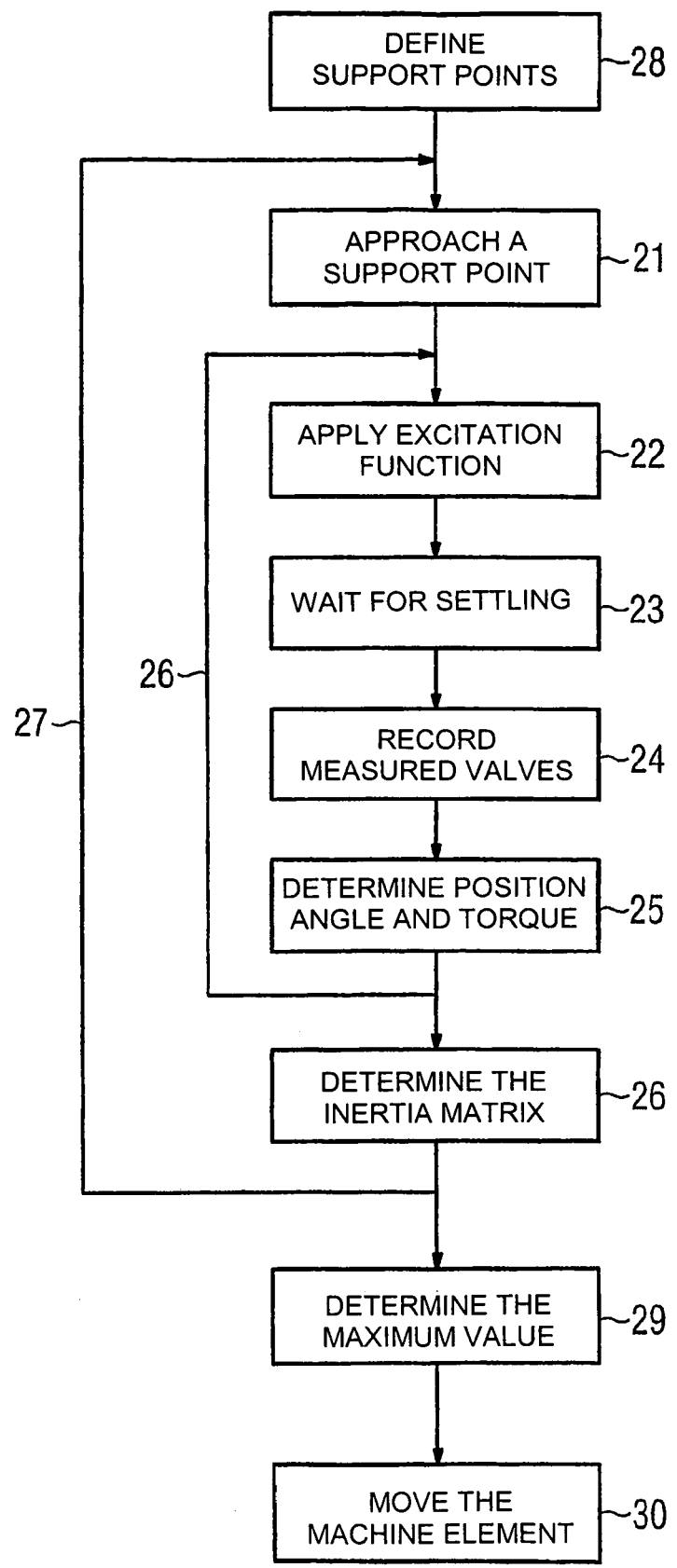
FIG. 4 shows the method according to the invention including the determination of the inertia matrix.
Figure 5:
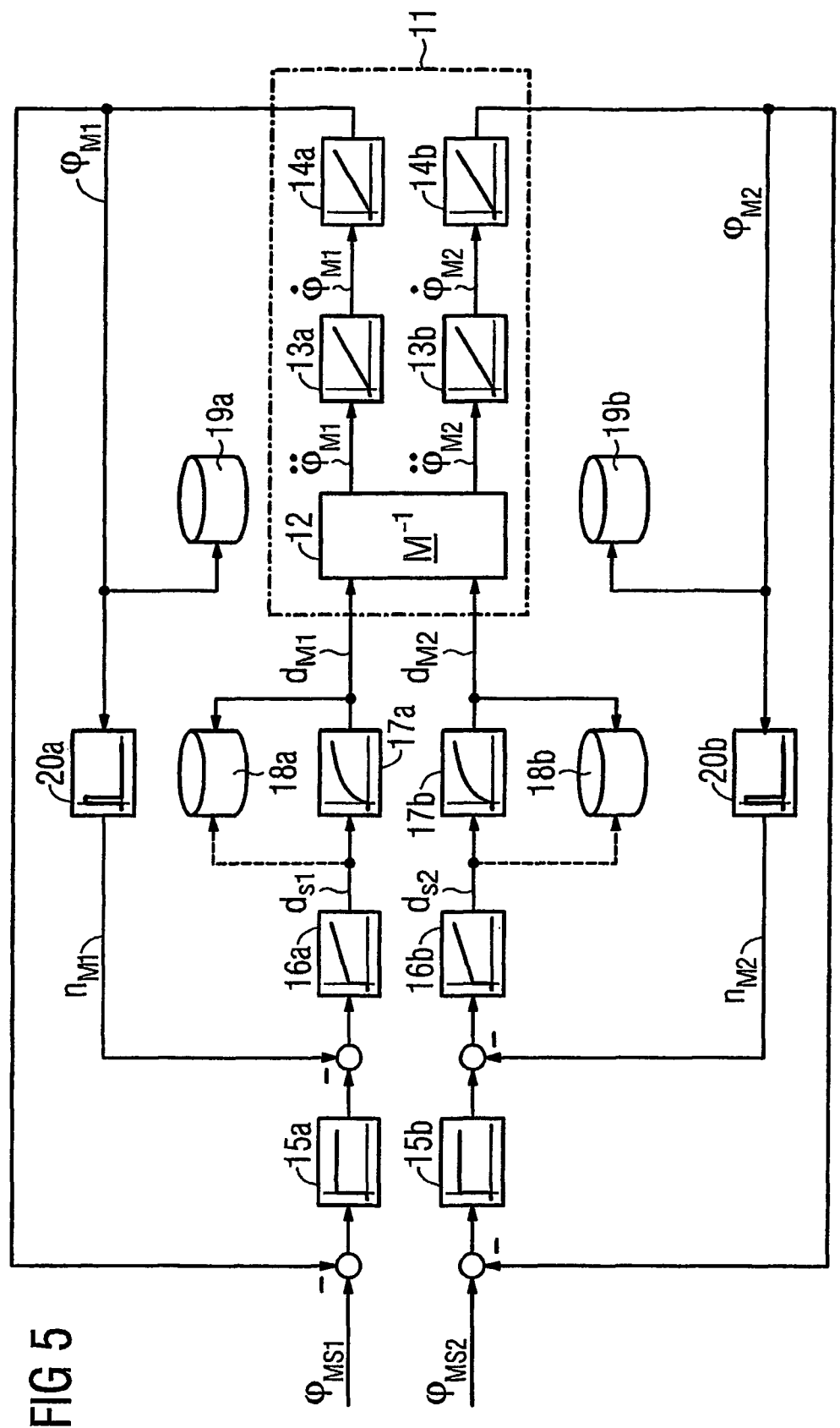
FIG. 5 shows two position control loops of the machine, including a machine simulation.

FIG. 5 illustrates the two position control loops of the two-axis machine (assumed by way of example) in accordance with FIG. 1, including a simulation of the mechanism 11 of the machine. The position control loop of the drive axis 6a from FIG. 1 is illustrated in the top half of FIG. 5, while the position control loop of the drive axis 6b is illustrated in the bottom half of FIG. 5. In order to control the motor position angle $\phi_{M1}$ of the drive axis 6a or to control the motor position angle $\phi_{M2}$ of the drive axis 6b, the upper position control is fed a motor position angle $\phi_{M1}$ and the lower position control is fed the motor position angle $\phi_{M2}$ respectively. The difference between motor position angle $\phi_{M1}$ or $\phi_{M2}$ and nominal motor position angle $\phi_{MS1}$ or $\phi_{MS2}$ is respectively fed to a proportional element 15a or 15b and multiplied by a proportionality factor. Taking the motor position angle $\phi_{M1}$ or $\phi_{M2}$, a differentiator 20a or 20b differentiates the motor position angle $\phi_{M1}$ or $\phi_{M2}$ and multiplies it by the factor $1/2\pi$, thereby determining a motor speed $n_{M1}$ or $n_{M2}$. The difference between motor speed $n_{M1}$ or $n_{M2}$ and the output signal of the proportional element 15a or 15b is fed to a respectively associated proportional-integral-controller 16a or 17b that calculates a torque $d_{S1}$ or $d_{S2}$ as output signal. The torque $d_{S1}$ or $d_{S2}$ is fed in accordance with FIG. 4 to a first-order delay block 17a or 17b.

As output variable, the first-order delay block 17a outputs the driving torque $d_{M1}$ of the drive motor 4a in accordance with FIG. 1. As output variable, the first-order delay block 17b outputs the driving torque $d_{M2}$ of the drive motor 4b in accordance with FIG. 1. The mass properties and inertia properties of the machine are simulated in the function block 11 depicted by dots and dashes. This simulation is essentially performed by a function block 12 that represents the inverse of the inertia matrix $\underline{M}$. Two driving torques $d_{M1}$ or $d_{M2}$ are multiplied by the inverse of the inertia matrix $\underline{M}$ and in such a way the motor angular acceleration $\ddot{\phi}_{M1}$ or $\ddot{\phi}_{M2}$ is calculated and output.

The motor angular velocity $\dot{\phi}_{M1}$ $\dot{\phi}_{M2}$ is calculated from the motor angular acceleration $\ddot{\phi}_{M1}$ or $\ddot{\phi}_{M2}$ with the aid of the integrators 13a and 13b. The motor position angle $\phi_{M1}$ or $\phi_{M2}$ is calculated from the motor angular velocity $\dot{\phi}_{M1}$ and $\dot{\phi}_{M2}$ by integrating once again with the aid of the integrators 14a and 14b.

It may be remarked at this juncture that, in the case of a real machine the respective motor position angle $\phi_{M1}$ or $\phi_{M2}$ are self-evidently made available as measured variables to the position control loops by corresponding transmitters allocated on the drive motors 4a or 4b. In order to permit the viewer a better functional understanding of the inertia matrix $\underline{M}$, the mechanism 11 of the machine has been simulated in FIG. 5 in the form of the inverse of the inertia matrix $\underline{M}$ and two respectively downstream integrators 13a, 14a or 13b, 14b inside the position control loop of the machine. In a real machine, the inverters 3a or 3b in accordance with FIG. 1 generate the two driving torques $d_{M1}$ and $d_{M2}$ in conjunction with the motors 4a or 4b.

FIG. 5 further illustrates four memories 18a, 18b, 19a and 19b, that store the values of the motor position angles $\phi_{M1}$ or $\phi_{M2}$ and the values of the driving torques $d_{M1}$ and $d_{M2}$ in accordance with FIG. 5.

The coupling of the drive axes via the inverse of the inertia matrix $\underline{M}$ acts in the closed position control loop not only via transmission paths from one input each to all outputs of the control system, but there exists in addition a mutual influence between the upper and lower position control loops.

Back to FIG. 4. After the approach to the support point, an excitation function f(t) is used in function block 22 to simultaneously excite all the drive axes of the machine with the aid of the excitation function f(t) respectively assigned to the drive axis. The excitation function f(t) generally has in this case a form in accordance with the relationship $$f(t) = a + b \cdot t + c \cdot \cos(2 \cdot \pi f t) + d \cdot \sin(2 \cdot \pi f t) \quad (1)$$

a constant offset
b constant gradient
c amplitude of the cos component
d amplitude of the sin component
f frequency of the excitation in Hertz.

Via the nominal motor position angle $\phi_{MS1}$ or $\phi_{MS2}$ the excitation function f(t) is fed into the two position control loops, it being possible to select the parameters a, b, c and d differently for the individual drive axes of the machine, whereas it is necessary by contrast, to select an identical frequency for all the drive axes. A value of zero is expediently assumed for the parameter a since the parameter a would otherwise effect only a constant deviation from the support point, it to be the parameter a has already been used in advance in order to approach the instantaneous support point. The specifications of the individual machine dictate how the parameters are to be selected individually. The deflection from the support point by means of the excitation function f(t) should, however, be kept small so that it is possible to assume a linear system performance overall. Thus, in the steady-state condition all the variables and signals in the system in the position control loop have a harmonic characteristic of the same frequency. The function block 23 waits for the settling time of the system, before the recording of the measured values begins in function block 24.

Upon expiry of the settling time, which is a function of the frequency of the excitation function f(t) and the dynamics of the position control loop, the motor position angle $\phi_{M1}$ and the driving torque $d_{Mi}$ are respectively recorded and stored in each case for all the position control loops and drive axes of the machine. The memories 18a, 18b, 19a and 19b are used for storage in the exemplary embodiment. The above named variables should in this case be stored over a few periods of the excitation function f(t). The index i (i=1 . . . n) designates the number of the respective drive axis. i=1 and i=2 for the two-axis machine specified in the exemplary embodiment. It may be mentioned at this juncture that instead of the two-axis machine of the exemplary embodiment it is also possible to use a machine with as many axes as desired.

Subsequently, the coefficients $\hat{c}_{\ddot{\phi}i}$ and $\hat{d}_{\ddot{\phi}i}$ of the motor angular acceleration $\ddot{\phi}_{M1}$ as well as the estimated amplitudes of the cosine and sine components $\hat{c}_{di}$ and $\hat{d}_{di}$ of the driving torque $d_{Mi}$ of the respective drive axis are identified in the function block 25. As a consequence of the linearization already mentioned above, the following formulation with corresponding coefficients can be specified for the driving torques $$d_{Mi} = \hat{a}_{di} + \hat{b}_{di} t + \hat{c}_{di} \cos(\omega t) + \hat{d}_{di} \sin(\omega t) \quad (2)$$

$d_{Mi}$ measured or stored characteristic of the driving torque of the ith drive axis (i=1 . . . n)

$\hat{a}_{di}$ estimated constant offset of the driving torque of the ith drive axis (i=1 . . . n)

$\hat{b}_{di}$ estimated constant gradient of the driving torque of the ith drive axis (i=1 . . . n)

$\hat{c}_{di}$ estimated amplitude of the cos component of the driving torque of the ith drive axis (i=1 . . . n)

$\hat{d}_{di}$ estimated amplitude of the sin component of the driving torque of the ith drive axis (i=1 . . . n).

It is also possible in a corresponding way to specify the formulation as follows for the characteristic of the motor position angle $$\phi_{Mi} = \hat{a}_{\phi i} + \hat{b}_{\phi i} t + \hat{c}_{\phi i} \cos(\omega t) + \hat{d}_{\phi i} \sin(\omega t) \quad (3)$$

$\phi_{Mi}$ measured or stored characteristic of the motor position angle of the ith drive axis (i=1 . . . n)

$\hat{a}_{\phi i}$ estimated constant offset of the motor position angle of the ith drive axis (i=1 . . . n)

$\hat{b}_{\phi i}$ estimated constant gradient of the motor position angle of the ith drive axis (i=1 . . . n)

$\hat{c}_{\phi i}$ estimated amplitude of the cos component of the motor position angle of the ith drive axis (i=1 . . . n)

$\hat{d}_{\phi i}$ estimated amplitude of the sin component of the motor position angle of the ith drive axis (i=1 . . . n).

The relationship 2 and the relationship 3 can be set up for each stored sample at the sampling instants $t_1, t_2 \ldots$ to $t_N$. It is thereby possible to specify two systems of equations 4a and 4b.

$$\underbrace{\begin{bmatrix} 1 & t_1 & \cos(\omega t_1) & \sin(\omega t_1) \\ 1 & t_2 & \cos(\omega t_2) & \sin(\omega t_2) \\ \vdots & \vdots & \vdots & \vdots \\ 1 & t_\nu & \cos(\omega t_\nu) & \sin(\omega t_\nu) \\ \vdots & \vdots & \vdots & \vdots \\ 1 & t_N & \cos(\omega t_N) & \sin(\omega t_N) \end{bmatrix}}_{\underline{A}} \underbrace{\begin{bmatrix} \hat{a}_{di} \\ \hat{b}_{di} \\ \hat{c}_{di} \\ \hat{d}_{di} \end{bmatrix}}_{\underline{x}} = \underbrace{\begin{bmatrix} d_{Mi}(t_1) \\ d_{Mi}(t_2) \\ \vdots \\ d_{Mi}(t_\nu) \\ \vdots \\ d_{Mi}(t_N) \end{bmatrix}}_{\underline{b}} \quad (4a)$$

$$\underbrace{\begin{bmatrix} 1 & t_1 & \cos(\omega t_1) & \sin(\omega t_1) \\ 1 & t_2 & \cos(\omega t_2) & \sin(\omega t_2) \\ \vdots & \vdots & \vdots & \vdots \\ 1 & t_\nu & \cos(\omega t_\nu) & \sin(\omega t_\nu) \\ \vdots & \vdots & \vdots & \vdots \\ 1 & t_N & \cos(\omega t_N) & \sin(\omega t_N) \end{bmatrix}}_{\underline{A}} \underbrace{\begin{bmatrix} \hat{a}_{\phi i} \\ \hat{b}_{\phi i} \\ \hat{c}_{\phi i} \\ \hat{d}_{\phi i} \end{bmatrix}}_{\underline{x}} = \underbrace{\begin{bmatrix} \varphi_{Mi}(t_1) \\ \varphi_{Mi}(t_2) \\ \vdots \\ \varphi_{Mi}(t_\nu) \\ \vdots \\ \varphi_{Mi}(t_N) \end{bmatrix}}_{\underline{b}} \quad (4b)$$

$t_\nu$ instants at which the measured values have been recorded ($\nu=1 \ldots N$)

Estimated values for the coefficients $\hat{a}_{di}, \hat{b}_{di}, \hat{c}_{di}, \hat{d}_{di}$ or $\hat{a}_{\phi i}, \hat{b}_{\phi i}, \hat{c}_{\phi i}, \hat{d}_{\phi i}$ can now be determined with the aid of the method at least squares. The respective coefficients are thus yielded in accordance with the relationship $$\underline{x} = (\underline{A}^T \underline{A})^{-1} \underline{A}^T \underline{b} \quad (5)$$

$\underline{A}^T$: transpose of the matrix $\underline{A}$ $\underline{A}^{-1}$: inverse of the matrix $\underline{A}$, $\underline{x}$ representing the vector of the respective coefficients.

What is obtained is thus a set of coefficients for the motor position angle $\phi_{Mi}$ and the driving torque $d_{Mi}$ for each drive motor.

The corresponding coefficients $\hat{c}_{\ddot{\phi}i}$ and $\hat{d}_{\ddot{\phi}i}$ of the motor angular acceleration $\ddot{\phi}i_{Mi}$ can be calculated from those of the motor position angle in accordance with the relationships 6 and 7.

$$\hat{c}_{\ddot{\phi}i} = -\omega^2 \hat{c}_{\phi i} \quad (6)$$

$$\hat{d}_{\ddot{\phi}i} = -\omega^2 \hat{d}_{\phi i} \quad (7)$$

$\omega$: angular frequency ($\omega = 2\pi f$)

It holds for the relationship between driving torque, inertia matrix $\underline{M}$ and motor angular acceleration that:

$$\begin{bmatrix} d_{M1} \\ d_{M2} \\ \vdots \\ d_{Mn} \end{bmatrix}_{\underline{d_M}} = \underbrace{\begin{bmatrix} m_{11} & m_{12} & \cdots & m_{1n} \\ m_{21} & m_{22} & & m_{2n} \\ \vdots & & \ddots & \vdots \\ m_{n1} & m_{n2} & \cdots & m_{nn} \end{bmatrix}}_{\underline{M}} \underbrace{\begin{bmatrix} \ddot{\varphi}_{M1} \\ \ddot{\varphi}_{M2} \\ \vdots \\ \ddot{\varphi}_{Mn} \end{bmatrix}}_{\underline{\ddot{\varphi}_M}} \quad (8)$$

$m_{ij}$: moment of inertia

The coefficients $\hat{c}_{\ddot{\varphi}i}$ and $\hat{d}_{\ddot{\varphi}i}$ of the motor angular acceleration $\ddot{\varphi}_{Mi}$ as well a the coefficients $\hat{c}_{di}$ and $\hat{d}_{di}$ of the driving torque $d_{Mi}$ are determined n times in a repetition loop 26 in accordance with the number n of drive axes, a change in the parameters b, c and d of the respective excitation function f(t) being performed with each repetition. After the coefficients of all the drive axes have been determined n times, the inertia matrix $\underline{M}$ is determined inside the function block 26.

Upon consideration of the relationship 8, a relationship can be set up between the functions for the driving torques and motor angular accelerations with the aid of the relationships 2 and 3 (see relationship 9).

$$d_{Mi} = \sum_{j=1}^{n} m_{ij}\ddot{\varphi}_{Mj} = \hat{a}_{di} + \hat{b}_{di}t + \hat{c}_{di}\cos(\omega t) + \hat{d}_{di}\sin(\omega t) \quad (9)$$

A comparison of coefficients delivers the relationships 10a to 10d for the coefficients.

$$\hat{a}_{di} = \sum_{j=1}^{n} m_{ij}\hat{a}_{\varphi j} \quad (10a)$$

$$\hat{b}_{di} = \sum_{j=1}^{n} m_{ij}\hat{b}_{\varphi j} \quad (10b)$$

$$\hat{c}_{di} = \sum_{j=1}^{n} m_{ij}\hat{c}_{\varphi j} \quad (10c)$$

$$\hat{d}_{di} = \sum_{j=1}^{n} m_{ij}\hat{d}_{\varphi j} \quad (10d)$$

All that is relevant in this case to the determination of the inertia matrix $\underline{M}$ are the coefficients that include the amplitude of the sinusoidal and cosinusoidal parts in the relationships 2 and 3, since the essential components of the excitation and excitation function f(t) are included here. As already stated previously, the individual coefficients are determined by traversing the function blocks 22 to 25 n times. The coefficients yield the system of equations 11, one row being produced in the system of equations 11 per drive axis, and the index parameter n signifying the total number of all drive axes.

$$\underline{M}\Phi = \underline{D}$$

with the matrix of the acceleration coefficients $$\Phi = \begin{bmatrix} \hat{c}_{\varphi 1}^{(1)} & \hat{c}_{\varphi 1}^{(2)} & \cdots & \hat{c}_{\varphi 1}^{(n)} & \hat{d}_{\varphi 1}^{(1)} & \hat{d}_{\varphi 1}^{(2)} & \cdots & \hat{d}_{\varphi 1}^{(n)} \\ \hat{c}_{\varphi 2}^{(1)} & \hat{c}_{\varphi 2}^{(2)} & \cdots & \hat{c}_{\varphi 2}^{(n)} & \hat{d}_{\varphi 2}^{(1)} & \hat{d}_{\varphi 2}^{(2)} & & \hat{d}_{\varphi 2}^{(n)} \\ \vdots & & \ddots & \vdots & \vdots & & \ddots & \vdots \\ \hat{c}_{\varphi n}^{(1)} & \hat{c}_{\varphi n}^{(2)} & \cdots & \hat{c}_{\varphi n}^{(n)} & \hat{d}_{\varphi n}^{(1)} & \hat{d}_{\varphi n}^{(2)} & \cdots & \hat{d}_{\varphi n}^{(n)} \end{bmatrix}.$$

and the matrix of the torque coefficients $$\underline{D} = \begin{bmatrix} \hat{c}_{d1}^{(1)} & \hat{c}_{d1}^{(2)} & \cdots & \hat{c}_{d1}^{(n)} & \hat{d}_{d1}^{(1)} & \hat{d}_{d1}^{(2)} & \cdots & \hat{d}_{d1}^{(n)} \\ \hat{c}_{d2}^{(1)} & \hat{c}_{d2}^{(2)} & \cdots & \hat{c}_{d2}^{(n)} & \hat{d}_{d2}^{(1)} & \hat{d}_{d2}^{(2)} & & \hat{d}_{d2}^{(n)} \\ \vdots & & \ddots & \vdots & \vdots & & \ddots & \vdots \\ \hat{c}_{dn}^{(1)} & \hat{c}_{dn}^{(2)} & \cdots & \hat{c}_{dn}^{(n)} & \hat{d}_{dn}^{(1)} & \hat{d}_{dn}^{(2)} & \cdots & \hat{d}_{dn}^{(n)} \end{bmatrix}$$

The inertia matrix $\underline{M}$ is now yielded by the method of least squares in accordance with relationship 12.

$$\underline{M} = \underline{D}\Phi^T(\Phi\Phi^T)^{-1} \quad (12)$$

The determination of the inertia matrix $\underline{M}$ for the support point is thus concluded. The method is now repeated for each support point until an inertia matrix $\underline{M}$ is determined for each defined support point, something which is indicated by the repetition loop 27 in FIG. 4.

The coefficients $c_1$, $c_2$, $c_3$ of equations 18 and 19 can be determined from the moment of inertia $m_{ij}$ of the inertia matrix $\underline{M}$. The values of the moments of inertia $m_{ij}$ correspond to the coefficients $\theta_{ij}$ of equations 18 and 19. It is possible in such a way to determine the maximum values for the path jerk $\dddot{s}$, the path acceleration $\ddot{s}$ and the path speed $\dot{s}$ in accordance with the equations 14 to 17.

The vector $\underline{d}_M = [d_{M1} \ldots d_{Mn}]$ of the driving torques, which includes the driving torques of the drive motors $d_{M1}$ to $d_{Mn}$, is known from data provided, for example, by the motor manufacturer. Consequently, the maximum possible acceleration of the drive motor can now be calculated for each drive axis i in accordance with relationships 14 to 19. With reference to the exemplary embodiment, the maximum possible path acceleration $\ddot{s}$ of the machine, for example can now be calculated as a function of support point.

Figure 2:
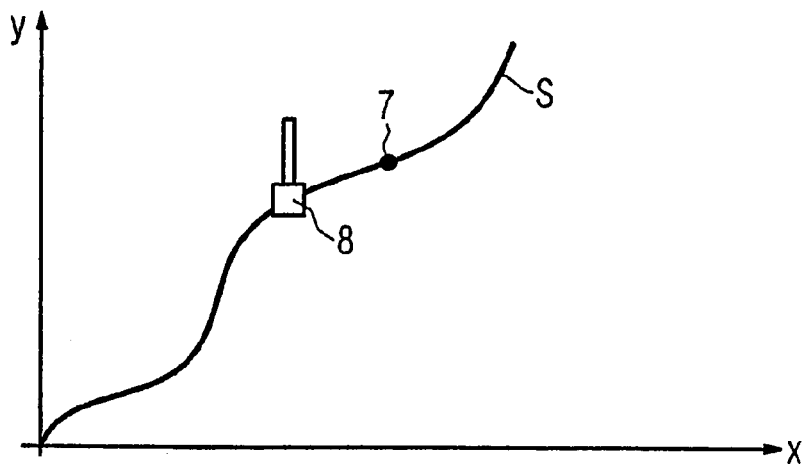
FIG. 2 shows a movement path S of a machine element.
Figure 3:
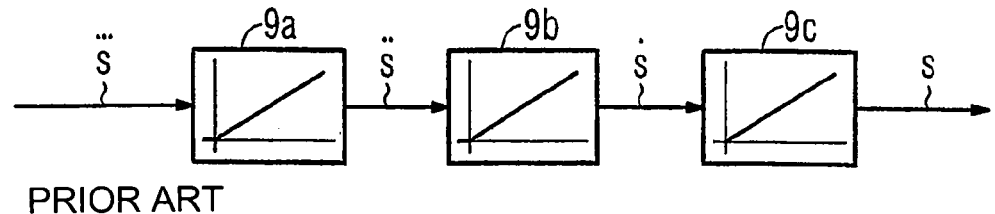
FIG. 3 shows a three-memory system for determining the movement guidance.

The maximum possible path acceleration $\ddot{s}$ can be determined for points on the movement path S in accordance with FIG. 2 that are not support points by means of smoothing the values determined at the support points. The maximum possible path jerk $\dddot{s}$ and/or the maximum possible path speed $\dot{s}$ for points on the movement path S in accordance with FIG. 2 that are not support points can also be determined in this same way. It is thereby ensured that only a relatively small number of support points need be defined on the movement path, and that an optimum movement guidance of the machine element is ensured nevertheless. The smoothing can be carried out in this case, for example by means of interpolation, extrapolation, averaging or similar methods.

From now on the movement of the machine element along the prescribed movement path S can always be carried out with the maximum possible path acceleration, something which is indicated by the function block 30 in FIG. 4.

Alternatively, instead of the driving torque $d_{M1}$ or $d_{M2}$ it is also possible to store in FIG. 4 the torque $d_{S1}$ or $d_{S2}$ in the memory 18a or 18b, something which is respectively indicated in FIG. 4 by a dashed arrow. The inertia matrix $\underline{M}$ can then be determined alternatively in an identical way with the aid of the torques instead of the driving torques.

The method according to the invention can be performed in this case upon demand by the user during commissioning of the machine or in cyclical or prescribed intervals or with reference to the situation.

The spaces of the individual support points can be optimized, for example in such a way that the spacings of individual support points are selected to be smaller at particularly critical junctures, whereas the spacings can be selected to be larger at uncritical junctures, for example when traveling straight ahead along an axis.

A special case obtains when given a machine with constant inertia conditions. A single working point then suffices, for example, in order to determine the maximum possible path acceleration $\ddot{s}$. All the remaining points of the working area then automatically have the same maximum possible path acceleration $\ddot{s}$. The applies equally to the path jerk $\dddot{s}$ and the path speed $\dot{s}$.

If a suitable simulation system is available with the aid of which the maximum possible path jerk $\dddot{s}$ and/or the maximum possible path acceleration $\ddot{s}$ and/or the maximum possible path speed $\dot{s}$ of the machine element of the machine can be determined in advance at the support points and/or working points on the movement path S of the machine element, these variables can also be prescribed directly for the controller of the machine without this first having to be determined by means of a traveling movement.

It may be pointed out at this juncture that the term machine tools is to be understood as meaning, for example, single-axis or multi-axis lathes, milling machines, drilling machines or grinding machines. Machine tools are also deemed to encompass machining centers, linear and rotary transfer machines, laser machines or rolling-up tools and gear-cutting machines. Common to them all is that a material is machined, it being possible to execute this machine on a number of axes. Counting among the production machines are, for example, textile, plastic, wood, glass, ceramic or stone-working machines. Machines in the technologies of plastic shaping, metal forming, packaging, printing, material-handling, pumping, ventilation and hoisting as well as robots likewise belong to the production machines.

The invention claimed is:

1. A method for guiding the movement of a movable machine element of a machine using position control circuits, said machine element having a prescribed movement path in a working area and having a drive motor including at least one drive axis, said working area having support points, said method comprising the steps of:
associating a support point with a respective movement maximum value for the machine element, the respective movement maximum value being produced for each drive axis of the machine using a maximum driving torque of the drive motor and an inertia matrix; and
moving the machine element on the movement path in accordance with the respective associated movement maximum value;
using a respective excitation function to excite the position control circuit of each drive axis over a given period of time as the machine element approaches the support point;
simultaneously storing motor position angle and driving torque values for each drive axis as the machine element approaches the support point;
using the stored values to produce coefficients of driving torque and coefficients of motor position angle for each drive axis, using the respective excitation function;
determining an inertia matrix for each respective support point using acceleration and torque coefficients produced for each drive axis, as each support point of the machine element is approached.

2. The method of claim 1, wherein the respective movement maximum value is a maximum path jerk of the machine element.

3. The method of claim 1, wherein the respective movement maximum value is a maximum path acceleration of the machine element.

4. The method of claim 1, wherein the respective movement maximum value is a maximum path speed of the machine element.

5. The method of claim 1, further comprising the step of defining a grid-like subdivision of the working area of the machine wherein support points in the working area of the machine are defined by the grid-like subdivision of the working area.

6. The method of claim 1, further comprising the step of defining a grid-like subdivision of the working area of the machine wherein support points in the working area of the machine are individually prescribed by a user for a specific movement path.

7. The method of claim 1, further comprising the steps of:
defining working points on the working area that are not support points;
determining a respective smoothing maximum value associated with each working point using respective movement maximum values associated with respective support points; and
moving the machine element at a working point in accordance with the respective smoothing maximum value associated with the working point.

8. The method of claim 1, wherein the simultaneously stored driving torque is a measured torque value.

9. The method of claim 1, wherein the simultaneously stored driving torque is an applied torque value.

10. The method of claim 1, further comprising the step of associating the respective movement maximum value associated with one support point with another support point when inertial conditions of the machine element are constant.

11. The method of claim 1, further comprising the step of: determining a respective movement maximum value of the machine element of the machine are determined at a support point using a simulation.

12. The method of claim 1, further comprising the step of: using the movement path of the machine element in the working area of the machine to define at least one support point.

13. Apparatus having position control circuits for guiding the movement of a movable machine element of a machine, said machine element having a prescribed movement path in a working area, said working area having support points, said apparatus comprising:
a drive motor including at least one drive axis;
means for determining an inertia matrix;
means for associating a respective movement maximum value for the machine element with a support point, said respective movement maximum value being produced for each drive axis of the machine using a maximum driving torque of said drive motor and said inertia matrix; and means for moving the machine element on the movement path in accordance with the respective associated movement maximum value, said matrix-determining means including:

means for using a respective excitation function to excite the position control circuits of each drive axis over a given period of time as the machine element approaches said support point;

means for simultaneously storing motor position angle and driving torque values for each drive axis, as the machine element approaches said support point;

means for using said stored values to produce coefficients of driving torque and coefficients of motor position angle for each drive axis, using said respective excitation function;

means for determining an inertia matrix for said support point using acceleration and torque coefficients produced for each drive axis, as each support point of the machine element is approached.

14. The apparatus of claim 13, wherein said respective movement maximum value is a maximum path jerk of the machine element.

15. The apparatus of claim 13, wherein said respective movement maximum value is a maximum path acceleration of the machine element.

16. The apparatus of claim 13, wherein said respective movement maximum value is a maximum path speed of the machine element.

17. The apparatus of claim 13, further comprising means for defining a grid-like subdivision of the working area of the machine and means for defining support points in the working area of the machine using said grid-like subdivision of the working area.

18. The apparatus of claim 13, further comprising means for individually prescribing support points so that said support points in the working area of the machine are individually prescribed by a user for a specific movement path.

19. The apparatus of claim 13, further comprising:

means for defining working points on the working area that are not the support points;

means for determining a respective smoothing maximum value associated with each of said working points using said respective movement maximum values associated with respective support points; and means for moving the machine element at a working point in accordance with said respective smoothing maximum value associated with said working point.

20. The apparatus of claim 13, wherein said simultaneously stored driving torque is a measured torque value.

21. The apparatus of claim 13, wherein said simultaneously stored driving torque is an applied torque value.

22. The apparatus of claim 13, further comprising means for associating the respective maximum value associated with a given support point with another support point when inertial conditions of the machine element are constant.

23. The apparatus of claim 13, further comprising means for determining a respective movement maximum value of the machine element of the machine at a support point using a simulation.

24. The apparatus of claim 13, further comprising means for using the movement path of the machine element in the working area of the machine to define at least one support point.

* * * * *